(12) United States Patent
Reddy et al.

(10) Patent No.: US 7,913,757 B2
(45) Date of Patent: Mar. 29, 2011

(54) METHODS OF FORMULATING A CEMENT COMPOSITION

(75) Inventors: B. Raghava Reddy, Duncan, OK (US); Krishna M. Ravi, Kingwood, TX (US)

(73) Assignee: Halliburton Energy Services. Inc., Duncan, OK (US)

( * ) Notice: Subject to any disclaimer, the term of this patent is extended or adjusted under 35 U.S.C. 154(b) by 131 days.

(21) Appl. No.: 11/228,099

(22) Filed: Sep. 16, 2005

(65) Prior Publication Data

US 2007/0062691 A1 Mar. 22, 2007

(51) Int. Cl.
E21B 47/00 (2006.01)
E21B 33/13 (2006.01)

(52) U.S. Cl. .............. 166/250.01; 166/250.14; 166/285; 166/292

(58) Field of Classification Search ............. 166/250.01, 166/250.14, 285, 292, 293, 294, 295
See application file for complete search history.

(56) References Cited

U.S. PATENT DOCUMENTS

| | | | |
|---|---|---|---|
| 1,986,335 A * | 1/1935 | Halbach | ........................ 106/713 |
| 3,021,291 A | 2/1962 | Thiessen | |
| 3,214,393 A | 10/1965 | Sefton | |
| 3,361,688 A | 1/1968 | Bonitz et al. | |
| 3,363,689 A | 1/1968 | Smith et al. | |
| 3,764,357 A | 10/1973 | Bowles et al. | |
| 3,869,295 A | 3/1975 | Bowles et al. | |
| 4,304,298 A | 12/1981 | Sutton | |
| 4,306,395 A | 12/1981 | Carpenter | |
| 4,340,427 A | 7/1982 | Sutton | |
| 4,367,093 A | 1/1983 | Burkhalter et al. | |
| 4,398,958 A | 8/1983 | Hodson et al. | |
| 4,450,010 A | 5/1984 | Burkhalter et al. | |
| 4,537,918 A | 8/1985 | Parcevaux et al. | |
| 4,565,578 A | 1/1986 | Sutton et al. | |
| 4,721,160 A | 1/1988 | Parcevaux et al. | |
| 5,049,288 A | 9/1991 | Brothers et al. | |
| 5,135,577 A | 8/1992 | Brothers | |
| 5,159,980 A | 11/1992 | Onan et al. | |
| 5,258,072 A | 11/1993 | Gopalkirshnan et al. | |

(Continued)

FOREIGN PATENT DOCUMENTS

EP 0 816 301 A2 1/1998

(Continued)

OTHER PUBLICATIONS

Baroid Fluid Services brochures entitled "STEELSEAL Lost Circulation Material" and "STEELSEAL FINE Lost Circulation Material" dated Apr. 2005.*

(Continued)

*Primary Examiner* — Zakiya W Bates
*Assistant Examiner* — Angela M Ditrani
(74) *Attorney, Agent, or Firm* — Craig W. Roddy; Conley Rose, P.C.

(57) ABSTRACT

A method of cementing a wellbore in a subterranean formation, comprising formulating a cement composition that may be suitable for long-term zonal isolation of the subterranean formation by evaluating a subterranean formation, preparing a base cement composition, determining the compressive strength of the base cement composition, determining the tensile strength of the base cement composition, and adjusting the ratio of compressive strength to tensile strength as need to within a first optimizing range to form a first optimized cement composition, and placing the optimized cement composition in the wellbore.

28 Claims, 2 Drawing Sheets

U.S. PATENT DOCUMENTS

| | | | |
|---|---|---|---|
| 5,258,428 A | 11/1993 | Gopalkrishnan | |
| 5,262,452 A | 11/1993 | Gopalkrishnan | |
| 5,293,938 A | 3/1994 | Onan et al. | |
| 5,300,542 A | 4/1994 | Gopalkrishnan | |
| 5,358,047 A | 10/1994 | Himes et al. | |
| 5,469,736 A * | 11/1995 | Moake | 73/152.58 |
| 5,588,488 A | 12/1996 | Vijn et al. | |
| 5,688,844 A | 11/1997 | Chatterji et al. | |
| 5,736,594 A | 4/1998 | Boles et al. | |
| 5,779,787 A | 7/1998 | Brothers et al. | |
| 5,795,924 A | 8/1998 | Chatterji et al. | |
| 5,820,670 A * | 10/1998 | Chatterji et al. | 106/737 |
| 5,826,669 A | 10/1998 | Zaleski et al. | |
| 5,913,364 A | 6/1999 | Sweatman | |
| 5,945,387 A | 8/1999 | Chatterji et al. | |
| 5,964,293 A | 10/1999 | Chatterji et al. | |
| 6,098,711 A | 8/2000 | Chatterji et al. | |
| 6,167,967 B1 | 1/2001 | Sweatman | |
| 6,220,354 B1 * | 4/2001 | Chatterji et al. | 166/293 |
| 6,234,251 B1 | 5/2001 | Chatterji et al. | |
| 6,258,757 B1 | 7/2001 | Sweatman et al. | |
| 6,271,181 B1 | 8/2001 | Chatterji et al. | |
| 6,308,777 B2 | 10/2001 | Chatterji et al. | |
| 6,328,106 B1 | 12/2001 | Griffith et al. | |
| 6,330,917 B2 | 12/2001 | Chatterji et al. | |
| 6,401,817 B1 | 6/2002 | Griffith et al. | |
| 6,448,206 B1 | 9/2002 | Griffith et al. | |
| 6,500,252 B1 | 12/2002 | Chatterji et al. | |
| 6,503,870 B2 | 1/2003 | Griffith et al. | |
| 6,508,305 B1 * | 1/2003 | Brannon et al. | 166/293 |
| 6,508,306 B1 | 1/2003 | Reddy et al. | |
| 6,516,884 B1 | 2/2003 | Chatterji et al. | |
| 6,555,507 B2 | 4/2003 | Chatterji et al. | |
| 6,593,402 B2 | 7/2003 | Chatterji et al. | |
| 6,641,660 B1 | 11/2003 | Chatterji et al. | |
| 6,645,288 B1 | 11/2003 | Dargaud et al. | |
| 6,668,928 B2 | 12/2003 | Brothers et al. | |
| 6,697,738 B2 * | 2/2004 | Ravi et al. | 702/6 |
| 6,702,044 B2 | 3/2004 | Reddy et al. | |
| 6,715,553 B2 | 4/2004 | Reddy et al. | |
| 6,722,433 B2 | 4/2004 | Brothers et al. | |
| 6,722,434 B2 | 4/2004 | Reddy et al. | |
| 6,729,405 B2 | 5/2004 | DiLullo et al. | |
| 6,793,730 B2 | 9/2004 | Reddy et al. | |
| 6,823,940 B2 | 11/2004 | Reddy et al. | |
| 6,832,651 B2 * | 12/2004 | Ravi et al. | 166/292 |
| 6,837,316 B2 | 1/2005 | Reddy et al. | |
| 6,848,519 B2 | 2/2005 | Reddy et al. | |
| 6,858,566 B1 | 2/2005 | Reddy et al. | |
| 6,881,708 B2 | 4/2005 | Reddy et al. | |
| 6,902,001 B2 * | 6/2005 | Dargaud et al. | 166/293 |
| 6,902,002 B1 | 6/2005 | Chatterji et al. | |
| 6,907,929 B2 | 6/2005 | Leroy-Delage et al. | |
| 6,922,637 B2 | 7/2005 | Ravi et al. | |
| 6,926,081 B2 | 8/2005 | Sweatman et al. | |
| 7,137,448 B2 * | 11/2006 | Di Lullo Arias et al. | 166/292 |
| 7,448,449 B2 * | 11/2008 | Di Lullo Arias et al. | 166/292 |
| 2004/0055748 A1 | 3/2004 | Reddy et al. | |
| 2004/0144537 A1 | 7/2004 | Reddy et al. | |
| 2004/0167248 A1 | 8/2004 | Brothers et al. | |
| 2004/0171499 A1 | 9/2004 | Ravi et al. | |
| 2004/0198872 A1 | 10/2004 | Reddy et al. | |
| 2004/0256101 A1 * | 12/2004 | Fox et al. | 166/252.5 |
| 2005/0028981 A1 | 2/2005 | Reddy et al. | |
| 2005/0061206 A1 | 3/2005 | Reddy et al. | |
| 2005/0113262 A1 | 5/2005 | Ravi et al. | |

FOREIGN PATENT DOCUMENTS

| | | |
|---|---|---|
| EP | 1 394 133 A2 | 3/2004 |
| EP | 1 400 497 A2 | 3/2004 |
| GB | 2 407 317 A | 4/2005 |

OTHER PUBLICATIONS

Bourgoyne Jr., et al. Applied Drilling Engineering. 1991, Society of Petroleum Engineers, vol. 2.*

Halliburton brochure entitled "Latex 2000 Cement Additive" dated 1998.

Halliburton brochure entitled "MicroBond Expanding Additive for Cement" dated 1999.

Halliburton brochure entitled "MicroBond HT Cement Additive" dated 1999.

Halliburton brochure entitled "MicroBond M Cement Additive" dated 1999.

Halliburton brochure entitled "Silicalite Cement Additive" dated 1999.

Baroid Fluid Services brochure entitled "STEELSEAL® Lost Circulation Material" dated 2005.

Baroid Fluid Services brochure entitled "STEELSEAL® FINE Lost Circulation Material" dated 2005.

Halliburton brochure entitled "Super CBL Additive Cement Additive" dated 2005.

Halliburton brochure entitled "Tuf Additive No. 2 Lost-Circulation Additive" dated 1999.

AKZO NOBEL brochure entitled "Expancel" dated 2003.

Foreign communication related to a counterpart application dated Dec. 28, 2006.

Foreign communication from a related counterpart application—Canadian Office Action, Application No. CA 2,621,627, Sep. 23, 2009, 3 pages.

Foreign communication from a related counterpart application—European Patent Office Examination Report, Application No. EP 06 779 393.5, May 20, 2009, 7 pages.

Foreign communication from a related counterpart application—International Preliminary Report on Patentability, PCT/GB2006/003378, Mar. 18, 2008, 9 pages.

Foreign communication from a related counterpart application—Provision of a copy of the minutes in accordance with Rule 124(4) EPC, European patent application No. 06 779 393.5, Dec. 17, 2010, 6 pages.

Foreign communication from a related counterpart application—Decision to refuse a European Patent application, European patent application No. 06 779 393.5, Dec. 17, 2010, 15 pages.

* cited by examiner

BCC = base cement composition
CTR = compressive to tensile strength ratio
EM = elastic modulus
PR = Poisson's ratio

METHODS OF FORMULATING A CEMENT COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention generally relates to well cementing. More specifically, the invention relates to a methodology for selecting a cement composition to achieve long-term zonal isolation.

2. Background of the Invention

Zonal isolation refers to the isolation of a subterranean formation or zone, which serves as a source of a natural resource such as gas, oil, or water, from other subterranean formations. To achieve isolation of a subterranean formation, a well bore is typically drilled down to the subterranean formation while circulating a drilling fluid through the wellbore. After the drilling is terminated, a string of pipe, e.g., casing, is run in the wellbore. Next, primary cementing is typically performed whereby a cement slurry is placed in the annulus and permitted to set into a hard mass, thereby attaching the string of pipe to the walls of the wellbore and sealing the annulus. Subsequent secondary cementing operations such as squeeze cementing may also be performed.

Conventional cement slurry design for oil field applications involves optimizing slurry density, rheology, pump time, fluid loss, settling and gas migration mitigation during placement and compressive strengths for long term performance. Recently, properties such as tensile strengths, flexural strengths and elastic modulus have been employed as metrics to indicate long term performance. Other properties that are also important indicators for long-term performance of a cement sheath without failure include Poisson's ratio, frictional angle, and resistance to cyclic loading and unloading of pressure and temperature. During the life of the well, the cement sheath is subjected to detrimental cyclical stresses due to pressure and temperature changes. Measuring the cyclic stress value to which a cement sheath can be repeatedly subjected to may ensure that it can withstand a large number of cycles and provide zonal isolation during the life of the well. However, it is often found that no unequivocal correlation exists between different mechanical properties and cement sheath performance under cyclic stress conditions that would be expected in well operations over the life of the well.

Given the foregoing problems, it would be desirable to establish a correlation between different mechanical properties and long-term cement sheath performance. It would also be desirable to develop a methodology for designing a cement composition that can withstand the cyclical stresses that occur during the life of the well and is thereby suitable for long-term zonal isolation.

BRIEF SUMMARY OF SOME OF THE PREFERRED EMBODIMENTS

Disclosed herein is a method of cementing a wellbore in a subterranean formation, comprising formulating a cement composition that may be suitable for long-term zonal isolation of the subterranean formation by evaluating a subterranean formation, preparing a base cement composition, determining the compressive strength of the base cement composition, determining the tensile strength of the base cement composition, and adjusting the ratio of compressive strength to tensile strength as needed to within a first optimizing range to form a first optimized cement composition, and placing the optimized cement composition in the wellbore.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
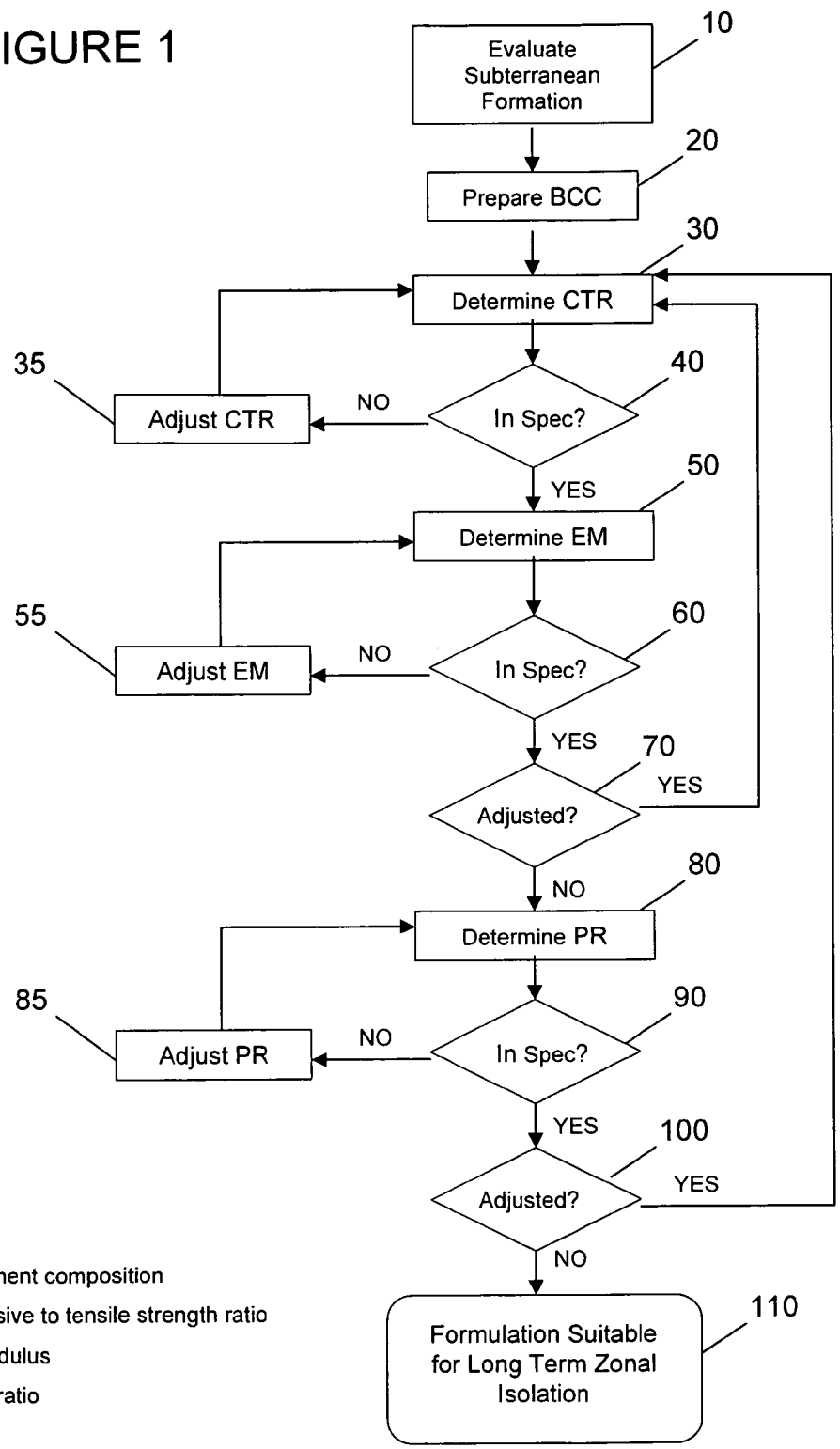
FIG. 1 is a flowchart of a method for formulating a cement composition.

An embodiment of a method for formulating a cement composition that may be suitable for long-term zonal isolation of a subterranean formation is set forth in FIG. 1. It is to be understood that herein references made to adjusting a cement property refer to adjustments made to a wet cement or cement slurry composition. Herein references made to determining the mechanical properties of a cement composition refer to evaluating the properties of the set cement composition. Herein an "optimizing range" refers to a range of acceptable values a particular parameter may assume. The "optimizing range" may be a particular range of numerical values the parameter may adopt or may be a value relative to that of a base cement composition (BCC), as indicated. In cases where the value is relative to that of the BCC (e.g., a slurry comprised substantially of cement and water) it is to be understood that the parameter being discussed was measured for the BCC in accordance with the referred to ASTM method.

Referring to FIG. 1, block 10, in an embodiment the method initiates with the evaluation of a subterranean formation to which a cement composition is to be introduced. It is to be understood that "subterranean formations" encompass both areas below exposed earth and areas below earth covered by water such as ocean or fresh water. The evaluation may begin with retrieval of samples of the formation and reservoir for laboratory analysis. In particular, for a wellbore, the method may initiate with the gathering of information to produce a well log. Such information typically includes the characteristics of the earth formations traversed by the wellbore, and the location of subsurface reservoirs of the natural resource. Well logging is a technique for providing information to a formation evaluation professional or driller regarding the particular earth formation being drilled. The collection of information relating to conditions downhole, which commonly is referred to as "logging," can be performed by several methods. In situ measurements of many formation properties via wellbore logging tools, such as logging-while-drilling (LWD) and wireline tools may be obtained by electromagnetic, acoustic, nuclear or electromechanical means, for example. These logging tools enable in situ determinations of properties such as the porosity, permeability, and lithology of the rock formations; reservoir pressure and temperature in the zones of interest; identification of the fluids present; and many other parameters. Methods of evaluating a subterranean formation and acquiring the information necessary to formulate a base cement composition are known to one of ordinary skill in the art.

Referring again to FIG. 1, the method proceeds to block 20 and a BCC is formulated. The BCC may be formulated so as to impart a baseline set of physical properties determined by evaluation of the subterranean formation as previously described, block 10. Such BCCs may be formulated so as to function in support of a casing in a wellbore, to isolate a subterranean formation or both and shall neither exceed the fracture gradient of the formation nor allow influx of formation fluids during the cementing phase.

In an embodiment, the BCC comprises water and a cement such as hydraulic cement, which includes calcium, aluminum, silicon, oxygen, and/or sulfur and which sets and hardens by reaction with the water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

The BCC may include a sufficient amount of water to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The cement compositions may comprise a density from about 4 lb/gallon to about 23 lb/gallon. In an embodiment, the cement compositions may comprise a density from about 12 lb/gallon to about 17 lb/gallon. In alternative embodiments, the cement compositions may be low-density cement compositions with a density from about 6 lb/gallon to about 14 lb/gallon.

The BCC may contain additives as necessary so as to impart a baseline set of physical properties as necessitated by the evaluation of the subterranean formation as previously described, block 10. Examples of additives include without limitation density reducing additives such as glass beads or foam and expanding additives such as gas, suspension aids, defoamers and the like. Formulation of the BCC so as to impart the baseline set of physical properties as necessitated by the evaluation of the subterranean formation may be carried out by techniques known to one of ordinary skill in the art.

Referring again to FIG. 1, following formulation and preparation of a BCC that meets the baseline set of physical properties as necessitated by the evaluation of the subterranean formation, the method proceeds to block 30 wherein the ratio of the compressive to tensile strength (CTR) of the BCC is determined.

Herein the compressive strength is defined as the maximum resistance of a material to an axial force. Within the limit of the compressive strength, the material becomes irreversibly deformed and no longer provides structural support and/or zonal isolation. The compressive strength of cement is recognized as a standard measure of cement quality and durability with high compressive strengths being an indicator of high quality. The compressive strength a cement formation attains is a function of both the cement maturity and the temperature at which setting occurs where the cement maturity specifically refers to the time the cement formulation is allowed to set. The compressive strength of the BCC may be determined in accordance with ASTM D 2664-95a.

Tensile strength is defined herein as the maximum longitudinal stress a material can withstand before tearing. Typically the tensile strength is envisioned as the forces required to pull apart the cement composition while the compressive strength can be envisioned as the force required to crush the cement composition. Cements typically have a low tensile strength when compared to the compressive strength and this may have important implications for the long-term zonal isolation since the stresses induced in a cement sheath by increased wellbore pressures are predominantly tensile in nature. For example, when processes such as stimulation treatments or fracturing are undertaken the cement sheath can have tensile stresses, which can occur indirectly through contact with the casing or directly through contact between the cement sheath and a fracturing fluid. The tensile strength of the BCC may be determined as described in test CRD-C 260-01 in the U.S. Army Corps of Engineers' Handbook for Concrete and Cement.

Following determination of the CTR, the method proceeds to block 40 and the CTR of the BCC is evaluated as to whether it falls within an optimizing range, also referred to as within specification (in spec) or outside of specification (out of spec). In an embodiment, the optimizing range or specification is from about 5 to about 9. When the CTR of the BCC is out of spec, the method proceeds to block 35 wherein the CTR is adjusted. Alternatively, when the CTR of the BCC is in spec, the method proceeds to block 50.

Referring to block 35, the CTR of the BCC may be adjusted by any means suitable for adjusting the compressive and tensile strengths of a cement composition. For example, the CTR may be adjusted by the inclusion of strength modifying additives (SMA). SMAs are known to one skilled in the art. Without limitation, examples of SMAs are strength enhancing additives and fibers such as plastic, carbon or glass fibers.

In an embodiment, the SMA is a plastic fiber. Fine monofilaments of plastic fibers have been used to improve the tensile strength of cement while reducing plastic shrinkage cracking. Plastic shrinkage cracking occurs from constraints on the shrinkage of a cementious composition as it sets. The constraints arise, for example, from the cement being cast on in a subterranean formation to make a wellbore. Examples of plastic fibers include. polypropylene (PP), polyethylene (PE), polyethylene terephthalate (PET), aramids (e.g., KEVLAR) and polyvinyl alcohol fibers. Methods of incorporating fibers into cement compositions to modify the compressive and tensile strength are known to one skilled in the art.

An effective amount of an SMA may be included with the BCC so as to produce a composition with a CTR in the optimizing range. Various SMAs are disclosed in U.S. Pat. Nos. 5,049,288, 6,793,730 and 5,358,047 each of which is incorporated by reference herein in its entirety.

Following adjustment of the CTR at block 35, the method returns to block 30 and the CTR of the BCC is again determined. Following determination of the CTR, the method again proceeds to block 40 and the CTR of the BCC is evaluated as to whether it falls in or out of spec. In an embodiment, the CTR of the BCC is out of spec, and the methods proceeds to block 35 wherein the CTR is adjusted as previously described. This CTR adjustment-determination-evaluation loop represented by blocks 35, 30, and 40 continues iteratively as necessary to prepare a BCC having a CTR in spec. Once the BCC is found to be in spec at block 40, the method proceeds to block 50, and the BCC is hereafter referred to as a first optimized cement composition (CC-1). Without wishing to be limited by theory, a CC-1 may have sufficient compressive and tensile strength such that the CC-1 is able to withstand the cyclic stresses experienced over the life of the structure to which the CC-1 provides support.

Referring to FIG. 1, following preparation of the CC-1, the method proceeds to block 50 wherein the elastic modulus (EM) of the CC-1 is determined. The EM, also termed Young's modulus, $\lambda$, is indicative of the elasticity of a material or the tendency of the material to reversibly or resiliently deform under an applied force. Young's modulus is represented by Equation (1)

$$\lambda = (F/A)/(x/1) \qquad (1)$$

where F is the applied force, A is the area to which the force is applied, x is the extension of the material when the force is applied and 1 is the original length of the material. In an embodiment, the elastic modulus of the CC-1 is determined in accordance with ASTM D 3148-02.

Following determination of the EM, the method proceeds to block 60 and the EM of the CC-1 is evaluated as to whether it is in an optimizing range. In an embodiment, the optimizing range of the EM is from about 30% to about 70% lower than the EM of the BCC. When the EM of the CC-1 is out of spec, the method proceeds to block 55 wherein the EM is adjusted. Alternatively, when the EM of the CC-1 is in spec, the method proceeds to block 70.

Referring to block 55, the EM may be adjusted by any means suitable for adjusting the EM of a cement composition while maintaining a density compatible with the requirements of the subterranean formation. Methods of adjusting the EM of a cement composition are known to one skilled in the art. For example, the EM may be adjusted using modulus-modifying additives (MMA) such as elastomers and rubbers.

In an embodiment, the MMA is any polymer that is normally regarded as elastomeric as for example and without limitation polyisoprene, polybutadiene, polyisobutylene, polyethers, polyesters, etc. Alternatively, the MMA is any polymer that is normally regarded as thermoplastic as for example and without limitation polystyrene, poly(methacrylate), isotactic polypropylene, polyurethane, etc. Alternatively, the MMA may be a copolymer formed by combinations of monomers used in production of the aforementioned materials.

In an embodiment, the MMA is a thermoplastic elastomer having a tensile strength by itself in the range of from about 500 psi to about 4000 psi, recoverable elongation of from about 200% to about 1000% and thermostability in the temperature range of from about 30° F. to about 500° F. In an embodiment, the thermoplastic elastomers may be added to CC-1 in an amount effective to adjust the EM of CC-1 to within the optimizing range. Such thermoplastic elastomers may be present in an amount of from about 5% to about 50%, alternatively from about 5% to about 30%, alternatively from about 5% to about 20%, all based on percentage by weight of the cement (% bwoc). Examples of suitable MMAs include the thermoplastic elastomers sold as FINAPRENE 411, FINAPRENE 435, FINAPRENE 401 and FINACLEAR by Total Petrochemical USA, Inc. or as KRATON products by Kraton Polymers. In an embodiment, the MMA (e.g., FINAPRENE 411 elastomer) has about the physical properties set forth in Table I.

TABLE I

| Property | FINAPRENE and other methods | Unit | Typical Value |
|---|---|---|---|
| Polymer type | | | SBS* |
| Structure | | | Radial |
| Physical appearance | | | Porous Crumb, Powder |
| Styrene/butadiene content | 1004 | % | 31/69 |
| Toluene solution viscosity | 1008 | mm2/s | 28.5 |
| Density at 23° C. | 2602 | g/cm³ | 0.94 |
| Oil content, phr | 1010 | | — |
| Melt flow rate 190° C./5 kg | 1006 | g/10 min | <0.5 |

*SBS=styrene butadiene block copolymer

In an alternative embodiment, the MMA is a rubber present in an amount effective to adjust the EM of CC-1 to within the optimizing range. Examples of suitable rubbers include, the natural rubber (cis-1,4-polyisoprene) and most of its modified types; synthetic polymers including styrene/butadiene rubber; cis-1,4-polybutadiene rubber or blends thereof with natural rubber or styrene/butadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber and polysulfide rubber. Such rubbers may be used either in the vulcanized or unvulcanized form.

Other copolymers that can be employed as MMAs include without limitation block copolymers of various olefins as for example ethylene/propylene copolymers wherein the ethylene block segments are generally considered elastomeric in nature and the polypropylene segments are generally considered semi-crystalline. Various elastomers and rubber compositions suitable for use as MMAs are disclosed in U.S. Pat. Nos. 5,688,844 and 5,293,938 each of which is incorporated by reference herein in its entirety.

Following adjustment of the EM at block 55, the method returns to block 50 and the EM of the CC-1 is again determined. Following determination of the EM, the method again proceeds to block 60 and the EM is evaluated as to whether it falls in or out of spec. In an embodiment, the EM of the CC-1 is out of spec, and the method proceeds to block 55 wherein the EM is adjusted as previously described. This EM adjustment-determination-evaluation loop represented by blocks 55, 50, and 60 continues iteratively as necessary to prepare a cement composition having an EM in spec. Once the EM is found to be in spec at block 60, the method proceeds to block 70.

At block 70, it is determined whether the CC-1 has been adjusted at block 55 as described previously. If so, such would indicate that the composition of the CC-1 has been altered (referred to as the adjusted CC-1), and therefore the method returns to block 30 to determine the CTR of the adjusted CC-1 and subsequently to block 40 to evaluate whether the CTR of the adjusted CC-1 remains in spec. Where the CTR of the adjusted CC-1 is not in spec, the method proceeds through blocks 35, 30 and 40 wherein the CTR is readjusted, redetermined and reevaluated until the CTR falls within spec, as described previously. The method then proceeds through blocks 50 and 60 wherein the EM of the CC-1 is determined and evaluated as previously described. In an embodiment, the EM of the CC-1 is not in spec and the method proceeds through blocks 55, 50 and 60 wherein the EM is readjusted, redetermined and reevaluated until the EM of the CC-1 again falls within spec, as described previously. In some embodiments, adjustments, determinations and evaluations of the CTR and/or EM of CC-1 continue iteratively as described until both values are in spec and no further adjustments are made to the CC-1, allowing the method to proceed from block 70 to block 80. The cement composition exiting block 70 and having both the CTR and EM in spec is hereafter referred to as a second optimized cement composition (CC-2). Without wishing to be limited by theory, a CC-2 having an EM in the optimizing range may be sufficiently resistant to deformation such that the cement composition is able to withstand the cyclic stresses experienced over the life of the structure to which the composition provides support, in addition to the advantages of a CC-1.

Referring to FIG. 1, following preparation of the CC-2, the method proceeds to block 80 wherein Poisson's ratio (PR) is determined. PR refers to the ratio of transverse contraction strain to longitudinal strain in the direction of stretching force and is represented by Equation (2):

$$v = \epsilon_{transverse} / \epsilon_{longitudinal} \quad (2)$$

where $v$ represents PR and $\epsilon$ represents strain as defined by the change in length divided by the original length. In an embodiment, Poisson's ratio (PR) of the CC-2 is determined in accordance with ASTM D 3148-02 (Standard Test Method for Elastic Moduli of Intact Rock Core Specimens in Uniaxial Compression).

Following determination of PR, the method proceeds to block 90 wherein the PR of the CC-2 is evaluated as to whether it falls within an optimizing range. In an embodiment, the optimizing range for PR is less than about 0.18, alternatively in the range of from about 0.09 to 0.18. When the PR of the CC-2 is out of spec, the method proceeds to block 85 wherein the PR is adjusted. Alternatively, when the PR of the CC-2 is in spec, the method proceeds to block 100.

Referring to block 85, the PR may be adjusted by any means suitable for adjusting the PR of a cement composition. Without wishing to be limited by theory, cement compositions having a PR in the optimizing range may have the ability to sustain cyclic stresses without significant volume changes and thus are suitable for long-term zonal isolation. Methods of adjusting the PR of a cement composition are known to one skilled in the art. For example, the PR may be adjusted using Poisson's ratio modifying additives (PRMA). Examples of suitable PRMAs are known to one skilled in the art and include without limitation flexible, compressible beads and resilient materials such as graphite carbon, liquids, non-aqueous fluids, solids, gases and the like. The resilient material may have a thermal expansion coefficient equal to or greater than about $1 \times 10^{-4}$ K$^{-1}$.

In an embodiment, a CC-2 having a PR in the optimizing range is formed by the inclusion of an effective amount of flexible, compressible beads. Flexible, compressible beads as used herein refer to beads that may expand and contract without adverse effect to the structure of the bead in response to changes in pressure and/or temperature. Any suitable flexible, compressible bead that may expand and contract and that is compatible with a cement (i.e., chemically stable over time upon incorporation into the cement) may be combined with the cement to adjust its PR. In an embodiment, the flexible, compressible beads may be substantially hollow objects filled with fluid, such as gas. Alternatively, the fluid inside the flexible, compressible beads is air, carbon dioxide, an inert gas such as nitrogen, or an organic liquid with a low boiling point such as n-butane, isobutane or pentane. In an embodiment, the flexible, compressible beads have a diameter of about 6 to 150 micrometers at 25° C. and atmospheric pressure.

In an embodiment, the flexible, compressible beads have a substantially uniform, flexible outer wall comprising of one or more elastomeric materials or polymers. The temperature at which the elastomeric material melts or becomes so soft that it loses its ability to contain the fluid and/or expand and contract may be higher than the temperature in the well bore, which may range from about 120° F. to about 400° F. In an embodiment, the elastomeric material may be a styrenic polymer, alternatively, a copolymer of methylmethacrylate and acrylonitrile or a terpolymer of methylmethacrylate, acrylonitrile, and vinylidene dichloride. Without limitation, a suitable flexible, compressible bead composed of this copolymer and this terpolymer is sold as EXPANCEL by Akzo Nobel, Inc. Several grades of EXPANCEL beads are available and may be selected depending upon the degree of expansion, the physical state, and the temperature range for a given application by one skilled in the art. Without limitation, other examples of materials that may be used to form the flexible wall include a styrene-divinylbenzene copolymer and polystyrene. Hollow polystyrene beads are available from many polystyrene suppliers, such as Huntsman Corporation of Houston, Tex. (sold as Expandable Polystyrene Grade GRADE 27, GRADE 51, or GRADE 55) and BASF Corporation of North Mount Olive, N.J. (sold under the tradename STYROPOR). The flexible, compressible beads may be incorporated into the cement in a concentration of from about 1% to about 200% by weight of the cement (bwoc), alternatively from about 2% to about 100%, and alternatively from about 5% to about 50%.

In an embodiment, the PRMA is a resilient material. Herein resilient materials refer to materials that are able to reduce in volume when exposed to a compressive force and return back to about their normal volume (e.g., pre-compressive force volume) when the compressive force subsides. In an embodiment, the resilient material returns to about the normal volume (e.g., to about 100% of the normal volume) when the compressive force subsides. In an alternative embodiment, the resilient material returns to a high percentage of the normal volume when the compressive force subsides. A high percentage refers to a portion of the normal volume that may be from about 70% to about 99% of the normal volume, alternatively from about 70% to about 85% of the normal volume, and further alternatively from about 85% to about 99% of the normal volume. Such materials may be solids, liquids or gases. An example of such a material is a gas, such as nitrogen, air or hydrogen present in the form of foam bubbles. The volume of the gas phase needed to make a cement composition resilient may be in the range of from about 0.01% to about 40% by volume of the cement composition under downhole conditions. The gas phase may be incorporated in the cement composition by any means known to one skilled in the art. Alternatively, the gas phase may be incorporated by injecting appropriate volume of the gas. Alternately, the gas phase may be generated by the use of solid materials incorporated in the cement slurry that generate gases upon exposure to the cement slurry or under downhole conditions. An example of a suitable gas generating material includes the cement additive sold as SUPER CBL by Halliburton Energy Services. This material generates hydrogen gas upon exposure to cement slurries under downhole conditions. Other gas generating material compositions suitable for incorporation into cement slurries are described in U.S. Pat. Nos. 6,715,553; 6,722,434; and 6,858,566, the relevant disclosures of which are incorporated by reference herein.

Solid materials or particles which undergo reversible volume changes with changes in stress may also be used as a PRMA. Such resilient solids may have thermal expansion coefficients greater than about $1 \times 10^{-4}$ K$^{-1}$. Without limitation, examples of suitable resilient solids include natural rubber, elastomeric materials, styrofoam beads, polymeric beads, and combinations thereof. Natural rubber includes rubber and/or latex materials derived from a plant. Elastomeric materials include thermoplastic polymers that have expansion and contraction properties from heat variances. Examples of suitable elastomeric materials include without limitation a styrene-butadiene copolymer, neoprene, synthetic rubbers, vinyl plastisol thermoplastics, and combinations thereof. Without limitation, examples of suitable synthetic rubbers include nitrile rubber, butyl rubber, polysulfide rubber, EPDM rubber, silicone rubber, polyurethane rubber, and combinations thereof. In some embodiments, the synthetic rubber comprises rubber particles from processed rubber tires (e.g., car tires, truck tires, and the like). The rubber particles may be of any suitable size for use in a wellbore fluid. In an embodiment, the rubber particles are of a size from about 10 microns to about 20 microns. Without limitation, processing the rubber tires may include mechanically removing metal such as steel surrounding the inner core of the tire and thereafter shredding and grinding the tire into the desired particle size. In some embodiments, the PRMA and the MMA may be the same or different, and may be selected from any PRMA or MMA described herein.

In an embodiment, the PRMA is resilient graphite. Graphite has a laminar structure. Without being limited by theory, it is believed that the layers in such a laminar structure provide the graphite with the ability to reduce in volume upon exposure to a compressive force and thereby provide expansion volume in the annulus. For instance, as the compressive force is applied and increased, the layers become correspondingly closer together, which may result in a reduction in volume of the graphite. Upon alleviating such an applied compressive force, the layers may spread apart, which may result in an increase in volume of the graphite. In some embodiments, the graphite may return to about the volume it occupied before exposure to the compressive force.

Graphitic carbon-based materials generally are considered resilient if they have a resiliency of at least about 20% after compression at 10,000 psi. As used herein, the term "resiliency" refers to the percentage increase in sample volume after release of a compaction pressure and is defined by the following formula:

$$\% \text{ Resiliency} = 100 \left( \frac{h_r}{h_o} - 1 \right)$$

wherein $h_o$ is the height of a column of the material being tested under the compaction pressure and $h_r$ is the height of the column of the material being tested after the compaction pressure is released. A resiliency test procedure is described in U.S. Pat. No. 5,826,669, the relevant disclosure of which is incorporated by reference herein.

An example of a suitable resilient carbon-based material includes without limitation a carbon additive having a particle size distribution d50 of less than about 20 microns sold as DESULCO 9090 RGC by Superior Graphite. Other examples of suitable graphites include without limitation the loss circulation additives, sold as STEELSEAL and STEELSEAL FINE by Baroid Drilling Fluids. An example of suitable particles comprising elastomeric styrene butadiene block or random copolymers is a styrene-butadiene random block copolymer sold as FINAPRENE 411 by Total Petrochemicals Elastomers USA, Inc. The resilient material used as a PRMA may be present in the range of from about 0.5% to about 30% by weight of the total cement composition. In an embodiment, any non-aqueous fluid with a thermal expansion coefficient higher than $2 \times 10^{-4}$ K$^{-1}$ may be used as the PRMA. Such fluids may be liquids or gases under ambient conditions. These fluids may be used as aqueous emulsions. The volume fraction of such fluids in total cement slurry volume may be in the range of from about 0.002 to about 0.3.

In an embodiment, an effective amount of a resilient material is added to the cement composition such that the PR of the CC-2 is adjusted to an optimizing range. For example, graphite carbon may be added to an amount of from about 1 vol. % to about 50 vol. %, alternatively from about 10 vol. % to about 40 vol. % resilient material, further alternatively from about 20 vol. % to about 30 vol. % resilient material, and alternatively from about 22 vol. % to about 26 vol. % resilient material.

Following adjustment of the PR at block 85, the method proceeds to block 80 and PR of the CC-2 is again determined. Following determination of the PR, the method again proceeds to block 90 and PR is evaluated as to whether it falls in or out of spec. In an embodiment, PR of the CC-2 is out of spec, and the method proceeds to block 85 wherein the PR adjusted as previously described. This PR adjustment-determination-evaluation loop represented by blocks 85, 80, and 90 continues iteratively as necessary to prepare a cement composition having a PR in the optimizing range. Once the PR is found to be in spec at block 90, the method proceeds to block 100.

At block 100, it is determined whether the CC-2 has been adjusted at block 85 as described previously. If so, such would indicate that the composition of the CC-2 has been altered (referred to as the adjusted CC-2) and the CTR and EM of the adjusted CC-2 need to be rechecked and readjusted as needed to be in spec, as described previously. Where the CC-2 has been adjusted, the method returns to block 30 to determine the CTR of the adjusted CC-2 and subsequently to block 40 to evaluate whether the CTR of the adjusted CC-2 remains in spec. Where the CTR of the adjusted CC-2 is not in spec, the method proceeds through blocks 35, 30 and 40 wherein the CTR is readjusted, redetermined and reevaluated until the CTR falls within spec, as described previously. The method then proceeds through blocks 50 and 60 wherein the EM of the CC-2 is determined and evaluated as previously described. In an embodiment, the EM of the CC-2 is not in spec and the method proceeds through blocks 55, 50 and 60 wherein the EM is readjusted, redetermined and reevaluated until the EM of the CC-2 again falls within spec, as described previously. The method then proceeds through blocks 80 and 90 wherein the PR of the CC-2 is determined and evaluated as previously described. In an embodiment, the PR of the CC-2 is not in spec and the method proceeds through blocks 85, 80 and 90 wherein the PR is readjusted, redetermined and reevaluated until the PR of the CC-2 again falls within spec, as described previously. In some embodiments, adjustments, determinations and evaluations of the CTR, EM, and/or PR of the CC-2 continue iteratively as described until all three values are in spec and no further adjustments are made to the CC-2, allowing the method to proceed from block 100 and conclude at block 110. The cement composition provided at block 110 and having the CTR, EM, and PR in spec is hereafter referred to as a third optimized cement composition (CC-3).

In various embodiments, the method may conclude after block 40 to produce a CC-1 suitable for use in a wellbore to provide long term zonal isolation. Alternatively, the method may conclude after block 60 to produce a CC-2 suitable for use in a wellbore to provide long term zonal isolation. Alternatively, the method may conclude at block 110 to produce a CC-3 suitable for use in a wellbore to provide long term zonal isolation.

As deemed appropriate by one skilled in the art, additional additives may be added to the CC-1, CC-2, or CC-3 for adjusting the values of the CTR, EM and PR into their optimizing ranges and/or for imparting other desired physical properties. Such additives may, or may not, simultaneously affect the CTR, EM and/or PR of the CC-3. Examples of such additives include, but are not limited to, set retarders such as lignosulfonates, fluid loss control additives, defoamers, dispersing agents, set accelerators, and formation conditioning agents. Other additives that may be introduced to the cement composition to prevent cement particles from settling to the bottom of the fluid are, for example, bentonite and silica fume, which is commercially available from Halliburton Energy Services Inc. under the tradename SILICALITE. Further, a salt such as sodium chloride may be added to the cement composition when the drilling zone has a high salt content.

In addition, modifications such as changes to the water-to-cement ratio and the addition of noncememtious materials such as flyash may be carried out as deemed appropriate by one skilled in the art to adjust the values of CTR, EM and/or PR into the disclosed optimizing ranges. Following inclusion of any additional additives, the CTR, EM and/or PR of the cement composition may be determined, evaluated and adjusted as disclosed herein.

In an embodiment a cement composition suitable for long term zonal isolation has a CTR of from about 5 to about 9, an EM of from about 30% to about 70% lower than the EM of a BCC, and a PR of from about 0.09 to about 0.18. Alternatively, a cement composition suitable for long term zonal isolation has a CTR of from about 5 to about 9 and an EM of from about 30% to about 70% lower than the EM of a BCC. Alternatively, a cement composition suitable for long term zonal isolation has a CTR of from about 5 to about 9 and a PR of from about 0.09 to about 0.18. Alternatively, a cement composition suitable for long term zonal isolation has a CTR of from about 5 to about 9.

In an embodiment, the methods disclosed may be carried out manually or may be automated in whole or part. For example, the calculations and determination of the mechanical properties of the disclosed cement compositions may be carried out using software and or equipment designed to evaluate and adjust the described parameters. Likewise, any or all of the determining, evaluating, and adjusting steps may be automated and/or computer controlled.

Cement compositions as described herein may be used in any suitable workspace for any suitable purpose. For example, the cement compositions described herein may be used in various cementing operations wherein the cement is prepared, placed into a workspace, and allowed to set. In an embodiment, the cement compositions are used in various surface applications to cement a workspace at or above the ground, for example, a workspace encountered in the construction industry. In another embodiment, the cement is used in a subterranean workspace, for example in cementing underground pipe such as sewer pipe or wellbore casing. In one embodiment, a cement composition as disclosed herein is placed into a wellbore. Methods for introducing compositions into a wellbore to seal subterranean zones are described in U.S. Pat. Nos. 5,913,364; 6,167,967; and 6,258,757, which are incorporated by reference herein in their entirety.

In one embodiment, the cement compositions may be employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be placed down through the conduit and up through the annulus one or more times, for example, twice, to clean out the hole. The cement composition may then be conveyed downhole and up through the annulus, thereby displacing the drilling fluid from the wellbore. The cement composition sets into a hard mass, which forms a cement column that isolates an adjacent portion of the subterranean formation and provides support to the adjacent conduit.

In another embodiment, the cement composition may be employed in a secondary cementing operation such as squeeze cementing, which is performed after the primary cementing operation. In squeeze cementing, the cement composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The cement composition sets within the permeable zones, thereby forming a hard mass to plug those zones and prevent fluid from leaking therethrough.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

Five cement slurries of compositions shown in Table 2 and density of 12.0 pounds per gallon were prepared according to API Recommended Practices 10B, Procedure 9, Twenty-Second Edition, December 1997. The slurries were poured into dog-bone briquette molds and 2"×5" cylinder molds and cured under a pressure a 3000 psi at 190° F. for 72 hrs in an autoclave. The autoclave was cooled and slowly depressurized. The dog bone samples were tested for tensile strength using Tinius-Olsen Load Frame Instrument according to test CRD-C 260-01 in the U.S. Army Corps of Engineers' Handbook for Concrete and Cement.

An average of four values for each sample is reported in Table 3. Stress-strain tests were performed as proscribed in ASTM D 3148-02 (Standard Test Method for Elastic Moduli of Intact Rock Core Specimens in Uniaxial Compression). Compressive strengths were determined by the stress-strain method using at least 4 cylinder samples, and average value for each sample is reported in Table 3. Cyclic compression tests were performed to determine the resistance of the cements to the repeated stress cycling that they could be subjected to during the life of the well.

The cyclic tests were designed to provide data about the cement response to initial load cycles starting at 50% of compressive strength and increasing 10% of compressive strength per cycle to the final level. The final level was set at the lower value of two standard deviations below the compressive strength, or 90% of compressive strength. The low stress level was set at the larger value of 100 psi, or 10% of compressive strength. One thousand (1,000) cycles were run at the final level unless the sample failed earlier. Samples that survived 1,000 cycles were then stressed to failure. The cyclic test program was constructed to complete a 1,000-cycle test in less than 14 hours, so that tests could be completed overnight. The initial partial load cycles were performed under displacement control at a displacement rate of 5 E-5 inches per second, to match the displacement rate of the stress-strain tests. The cyclic portion of the tests were run under force control with the first 10 cycles at 4 minutes per cycle, the next 50 cycles at 2 minutes per cycle, the next 190 cycles at 1 minute per cycle, and the last 750 cycles at 30 seconds per cycle. A final load cycle to failure was performed under displacement control at a displacement rate of 5 E-5 inches per second. In calculating average number of cycles for compositions which lasted 1000 cycles at which point they were stressed to failure, it is assumed that the corresponding sample lasted only 1000 cycles.

TABLE 2

| Components % bwoc | Composition 1 | Composition 2 | Composition 3 | Composition 4 | Composition 5 |
|---|---|---|---|---|---|
| Water, | 39.45 | 99.54 | 62.0 | 74.6 | 111.4 |
| Cement | 100 | 26 | 100 | 100 | 56 |
| Ultrafine particulate cement | | | | 15 | |
| Flyash | | 61 | | | 22 |
| Silica fume | | | 5 | | 22 |
| Lime | | 13 | | | |
| Bentonite | | 2 | | | 2 |
| Gas phase % by slurry volume | 26.54 | | | | |
| Cenospheres | | | | 55 | |
| Glass beads | | | 20.7 | | |
| Fluid loss agent | | | 0.7 | 0.7 | |
| Dispersant | | | 0.2 | 1.0 | |
| Retarder | | 0.06 | 0.06 | 0.5 (SCR-100) | 0.06 |
| Defoamer Gal/sack | | 0.023 | 0.025 | 0.025 | 0.025 |

TABLE 3

| | Composition 1 | Composition 2 | Composition 3 | Composition 4 | Composition 5 |
|---|---|---|---|---|---|
| Compressive Strength, psi (stress-Strain method) | 1050 | 1010 | 5970 | 4590 | 1800 |
| Tensile Strength, psi | 190 | 80 | 350 | 380 | 90 |
| CTR | 5.54 | 12.6 | 17.0 | 12.1 | 20.0 |
| Young's Modulus, ×$10^5$ psi | 8.08 | 3.28 | 1.12 | 1.07 | 4.64 |
| Poisson's Ratio | 0.151 | 0.139 | 0.207 | 0.220 | 0.194 |
| Total number of samples tested | 8 | 5 | 5 | 5 | 7 |
| Samples surviving 1000 cycles | 6 | 1 | 0 | 0 | 0 |
| Average number of cycles survived | 927 | 560 | 35 | 53 | 16 |
| Earliest Failure, No. of cycles | 157 | 11 | 2 | 34 | 1 |
| Latest failure if failed before 1000 cycles | 816 | 354 | 89 | 72 | 58 |

Figure 2:
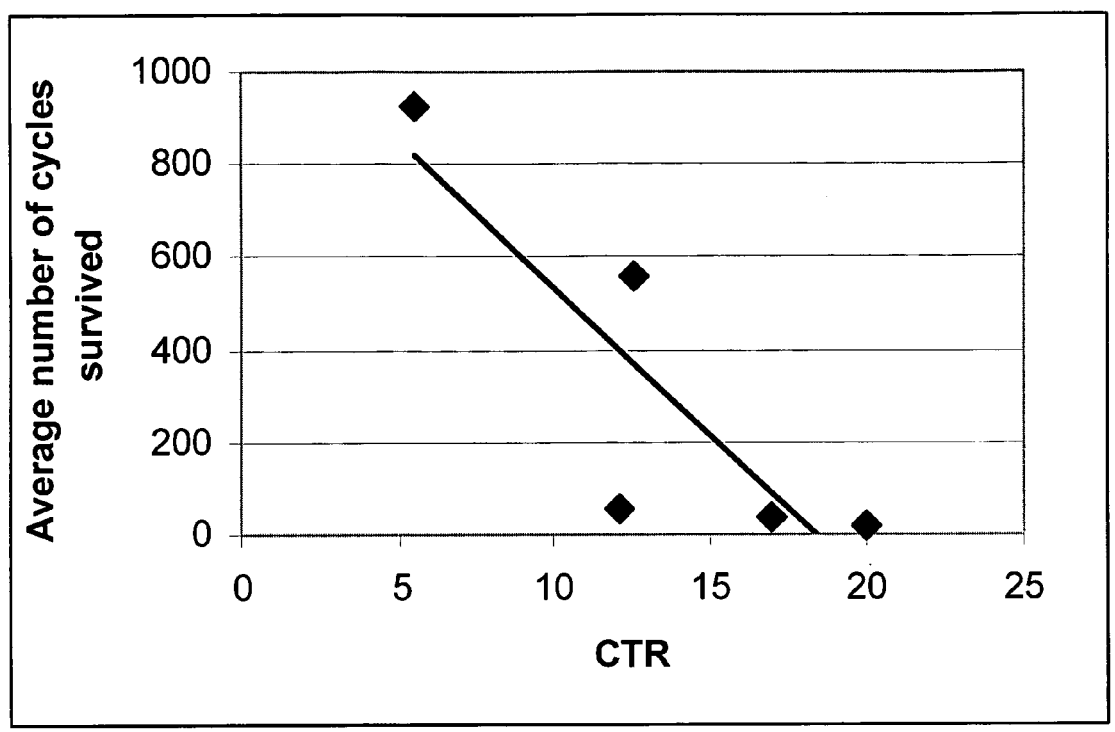
FIG. 2 is a graphical representation of cement performance as a function of mechanical properties.

The results in Table 3 clearly show that even when the compressive strengths are very high, for example for Compositions 3 and 4, the resistance to cyclic stresses is relatively poor. The relationship between CTR and number of cycles survived is graphically presented in FIG. 2 (It should be noted that the straight line drawn in the graph is intended to show only a trend and not a linear relationship). The results in Table 3 and FIG. 2 show that the cement formulations are more resistant to cyclic stresses when the CTR ratio is below 10. When two samples have similar CTR values for example, Composition 2 and Composition 4, the composition with lower Young's modulus and lower Poisson's Ratio, namely Composition 2 had a higher resistance to cyclic stresses.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of cementing a wellbore in a subterranean formation comprising:
   (i) evaluating the subterranean formation to which a cement composition is to be introduced;
   (ii) preparing a base cement composition comprising water and a cement, the base cement composition being formulated so as to impart a baseline set of physical properties determined by evaluation of the subterranean formation in step (i);
   (iii) determining and, if necessary, adjusting a ratio of the compressive strength to tensile strength (CTR) of the base cement composition to produce a firstly optimized cement composition, wherein adjusting the CTR comprises adding plastic fibers, carbon fibers, glass fibers, or combinations thereof to the base cement composition in an amount effective to provide the firstly optimized cement composition having a CTR in a first optimizing range of from about 5 to about 9;
   (iv) determining and, if necessary, adjusting an elastic modulus (EM) of the firstly optimized cement composition to produce a secondly optimized cement composition, wherein adjusting the EM comprises adding an elastomer, a rubber, or combinations thereof in an amount effective to provide the secondly optimized cement composition having an EM in a second optimizing range of from about 30% to about 70% of the EM of the base cement composition;
   (v) determining and, if necessary, adjusting Poisson's ratio (PR) of the secondly optimized cement composition to produce a thirdly optimized cement composition, wherein adjusting the PR comprises adding gas, resilient graphite, flexible compressible beads, a resilient material, or combinations thereof in an amount effective to provide the thirdly optimized cement composition having a PR in a third optimizing range of equal to or less than 0.18;
   (vi) placing the firstly, secondly, or thirdly optimized cement composition in the wellbore; and
   (vii) allowing the composition to set.

2. The method of claim 1 wherein the third optimizing range is from about 0.09 to about 0.18.

3. The method of claim 2 wherein the elastomer, rubber, or combinations thereof used to adjust the EM are present in an amount of from about 5 to about 50 percent by weight of cement.

4. The method of claim 2 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

5. The method of claim 1 wherein the resilient material is a non-aqueous fluid or a solid.

6. The method of claim 1 wherein the resilient material has a thermal expansion coefficient equal to or greater than about $1 \times 10^{-4} K^{-1}$.

7. The method of claim 1 wherein the flexible compressible beads are present in an amount of from about 1 to 200 percent by weight of cement.

8. The method of claim 7 wherein the elastomer, rubber, or combinations thereof used to adjust the EM are present in an amount of from about 5 to about 50 percent by weight of cement.

9. The method of claim 8 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

10. The method of claim 7 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

11. The method of claim 1 wherein the resilient graphite is present in an amount of from about 1 to about 50 volume percent.

12. The method of claim 11 wherein the elastomer, rubber, or combinations thereof used to adjust the EM are present in an amount of from about 5 to about 50 percent by weight of cement.

13. The method of claim 12 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

14. The method of claim 11 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4- polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

15. The method of claim 1 wherein Poisson's ratio is adjusted by adding natural rubber, styrofoam beads, styrene-butadiene copolymer, neoprene, synthetic rubbers, vinyl plastisol thermoplastics, nitrile rubber, butyl rubber, polysulfide rubber, EPDM rubber, silicone rubber, polyurethane rubber, or combinations thereof.

16. The method of claim 15 wherein the elastomer, rubber, or combinations thereof used to adjust the EM are present in an amount of from about 5 to about 50 percent by weight of cement.

17. The method of claim 16 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

18. The method of claim 15 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrite rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

19. The method of claim 1 wherein the ratio of compressive strength to tensile strength, elastic modulus, and Poisson's ratio are repeatedly adjusted as needed until all three are within the first, second, and third optimized ranges to form the thirdly optimized cement composition.

20. The method of claim 1 wherein the method of cementing a wellbore is cement squeeze.

21. The method of claim 1 wherein the evaluating the subterranean formation further comprises producing a well log from in situ measurements of formation properties.

22. The method of claim 21 wherein producing the well log comprises using logging while drilling tools, wireline tools, electromagnetic tools, acourstic tools, nuclear tools, electrochemical tools, or combinations thereof.

23. The method of claim 1 further comprising iteratively adjusting the ratio of the compressive strength to tensile strength so that the ratio falls within the first optimizing range.

24. The method of claim 1 further comprising iteratively adjusting the ratio of compressive strength to tensile strength, the elastic modulus, or both so that the ratios are within the first optimizing range, the second optimizing range, or both.

25. The method of claim 1 further comprising iteratively adjusting the ratio of compressive strength to tensile strength, the elastic modulus, Poisson's ratio or combinations thereof so that the ratios are in the first optimizing range, the second optimizing range, the third optimizing range, or combinations thereof.

26. The method of claim 1 wherein the elastomer, rubber, or combinations thereof used to adjust the EM are present in an amount of from about 5 to about 50 percent by weight of cement.

27. The method of claim 26 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

28. The method of claim 1 wherein the EM is adjusted by adding polyisoprene; polybutadiene; polyisobutylene; polyether; polyester; polystyrene; poly(methacrylate); isotactic polypropylene; polyurethane; natural rubber; styrene/butadiene rubber; cis-1,4-polybutadiene rubber; high styrene resin; butyl rubber; ethylene/propylene rubbers; neoprene rubber; nitrile rubber; cis-1,4-polyisoprene rubber; silicone rubber; chlorosulfonated rubber; polyethylene rubber; epichlorohydrin rubber; fluorocarbon rubber; fluorosilicone rubber; polyurethane rubber; polyacrylic rubber; polysulfide rubber; or combinations thereof.

\* \* \* \* \*